United States Patent

White

[15] 3,667,062

[45] May 30, 1972

[54] ACTIVE LINEAR DISCRIMINATOR CIRCUIT

[72] Inventor: Gary O. White, 7503 Cedar Hollow Drive, Louisville, Ky. 40291

[22] Filed: Mar. 30, 1971

[21] Appl. No.: 129,494

[52] U.S. Cl. ..............................329/142, 307/233, 307/321, 329/166, 329/192

[51] Int. Cl. ..........................................................H03d 3/26

[58] Field of Search .........................329/142, 138, 192, 166; 307/233, 321; 315/344

[56] References Cited

UNITED STATES PATENTS

| | | | |
|---|---|---|---|
| 2,906,873 | 9/1959 | Polyzou et al. | 329/142 |
| 3,210,570 | 10/1965 | Brock et al. | 307/233 X |
| 3,225,266 | 12/1965 | Baudo | 307/233 X |
| 3,248,659 | 4/1966 | Giger et al. | 329/166 X |

*Primary Examiner*—Alfred L. Brody
*Attorney*—R. S. Sciascia and H. H. Losche

[57] ABSTRACT

An active linear discriminator circuit having a transformer with a center-tapped primary and two center-tapped secondaries tuned on opposite sides of a desired center frequency, each tuned secondary output being demodulated to direct current (D.C.) levels applied across respective resistor and capacitor networks to produce a zero output when the input frequency is the desired center frequency and to produce positive and negative outputs in opposite relation proportional to input deviation above or below the center frequency.

7 Claims, 3 Drawing Figures

INVENTOR.
GARY O. WHITE
BY
H. H. Losche
ATTORNEYS

ACTIVE LINEAR DISCRIMINATOR CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE DISCLOSURE

This invention relates to linear discriminator circuits and more particularly to convert frequency variations or frequency shifts into linear D.C. level changes in both polarities while providing gain through both active and passive elements of the circuit. By the choice of an appropriate active element, either dual channel positive or negative D.C. level changes or pulses or single channel positive or negative D.C. level changes or pulses will result from the recovered conversion or modulation. D.C. isolation exists between the circuit input and output and a symmetrical output with respect to ground is maintained.

In the prior known devices the process of demodulating frequency variations to D.C. level changes has been accomplished through the use of passive demodulators, such as diodes. This normally results in signal attenuation; however, where one-half wave voltage doubling is used, ripple filtering problems are encountered. Typical discriminator circuits of the above known and discussed types are shown and described in U.S. Pat. Nos. 2,943,434 and 2,999,925. There is no known existent circuit capable of accomplishing all of the functions accomplished by the circuit described herein.

SUMMARY OF THE INVENTION

In the present invention a frequency signal is applied to a dual channel transformer through a balancing potentiometer to balance the input signal voltage equally to the two primaries. The secondary for each primary is center-tapped to ground with capacitive reactance elements across each secondary to provide resonant circuits in both secondary channels but of different resonant frequencies establishing a center frequency between the two. A full wave rectifier in each channel demodulates signals above or below the center frequency to produce a D.C. voltage across a resistor network proportional to the deviation from the center frequency. For center frequency the D.C. potentials in the positive and negative directions in the two channels cancel to produce a zero summation which summation is accomplished across a resistance network in the output of the rectifier and resistor networks. The input resonant circuits are all isolated to avoid interaction between the two channels. The advantages of this circuit are that amplification or gain is developed in the passive elements and full wave rectification avoids filtering normally required for half-wave rectification. By using an active element for discriminator loading the effective gain of the circuit is equal to the transformer step-up plus the active element gain. D.C. isolation, and therefore stability, is provided between the resonant circuits in the two channels and the signal developed across the resistance network is balanced, or symmetrical, with respect to ground at all times due to the symmetry of the circuit. The circuit is primarily for narrow band detection and therefore has a great immunity to noise. It is accordingly a general object of this invention to provide an active linear discriminator circuit that converts or demodulates frequency variations or shifts of an input frequency into D.C. level changes, positive and negative, over dual symmetrical channels to provide a resultant D.C. signal level proportional to the frequency variation.

BRIEF DESCRIPTION OF THE DRAWING

These and other objects and the attendant advantages, features, and uses of the invention will become more apparent to those skilled in the art as a more detailed description proceeds when considered in conjunction with the accompanying drawing in which.

DESCRIPTION OF THE PREFERRED EMBODIMENT

Figure 1:
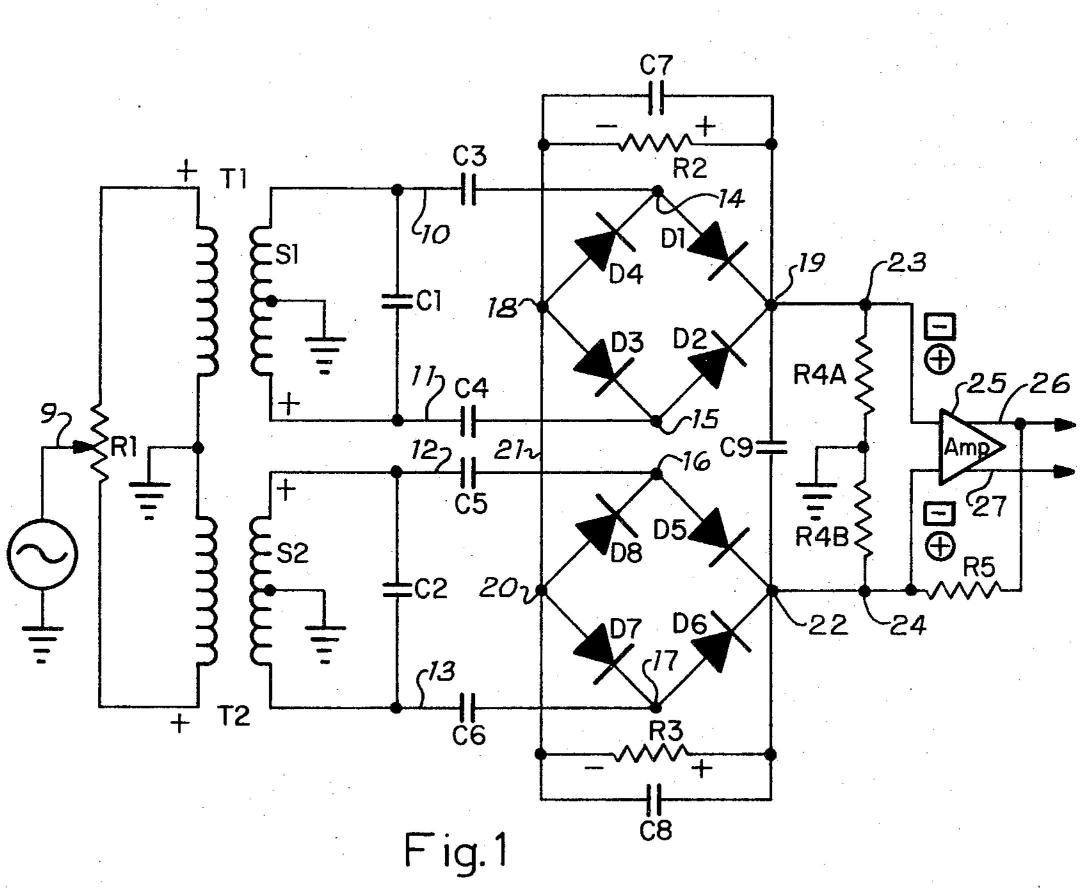
FIG. 1 is a circuit schematic of a preferred embodiment of the invention.

Referring more particularly to FIG. 1 of the active linear discriminator circuit, an input of a frequency to be discriminated is applied to the adjustable tap 9 of a potentiometer R1 having the resistance leads thereof applied to the lead of one primary winding in the transformer T1 and to one primary winding of a transformer T2, the opposite leads of each primary winding being coupled to a fixed potential usually represented and understood to be ground. The potentiometer R1 can be used to balance the voltage input to the two discriminator channels, to vary the ratio of the input signals, or to cut out one channel altogether. The secondaries S1 and S2 of transformers T1 and T2, respectively, are center-tapped to ground with a capacitor C1 coupled in parallel to the output leads 10 and 11 of the secondary S1 and a capacitor C2 coupled in parallel to the output leads 12 and 13 of the secondary S2. The secondary S1 and capacitor C1 provide one tuned circuit and the secondary S2 and capacitor C2 provide another tuned circuit which are not tuned to the same frequency, as will be made clear in the statement of operation. The primary and secondary of transformer T1 and its outputs 10 and 11 provide one frequency channel while the transformer T2 primary and secondary to the outputs 12 and 13 provide a second frequency channel.

The first tuned channel leads 10 and 11 are coupled to a first full wave crystal diode rectifier circuit consisting of diodes D1 through D4 coupled in bridge configuration with the lead 10 coupled to the input terminal 14 of the rectifier and the lead 11 coupled to the input terminal 15 of the rectifier. Each lead 10 and 11 is coupled through a D.C. voltage isolation element, such as capacitors C3 and C4, respectively. In like manner the second channel output lead 12 is coupled through an isolating capacitor C5 to an input terminal 16 of a second full wave crystal diode rectifier consisting of diodes D5 through D8 with the second output terminal 13 being coupled through an isolating capacitor C6 to the input terminal 17 of the rectifier. The output terminals 18 and 19 of the first rectifier are coupled in parallel by a resistor R2 and a capacitor C7 while the output terminals 20 and 22 of the second rectifier are coupled through a resistor R3 and a capacitor C8 in parallel. The output terminals 18 and 20 of the two rectifiers are coupled in common by the lead 21. The output terminals 19 and 22 of the two rectifiers are coupled through a capacitor C9 and also in parallel therewith through a resistor R4 which may be a single resistor center-tapped to ground or two resistors, herein illustrated as being R4A and R4B. The output terminals 19 and 22 provide output terminals of the discriminator circuit at terminals 23 and 24, respectively. Since the two channels of rectifier circuits are isolated from the channels of tuned circuits by capacitors C3 through C6, the rectifier circuits are floating and the outputs 23 and 24 are conditioned with respect to ground by the ground terminal of the juncture of R4A and R4B.

The discriminator outputs 23 and 24 are coupled to an active amplifying element such as a D.C. differential amplifier 25 producing outputs 26 and 27. The output 26 is coupled back through a resistor R5 to terminal 24. The resistors R2, R3, R4, and R5 along with capacitors C7, C8, and C9 are RC networks which provide ripple filtering for the discriminator. Specific values of these elements depend upon the frequency involved.

OPERATION OF FIGURE 1

Figure 2:
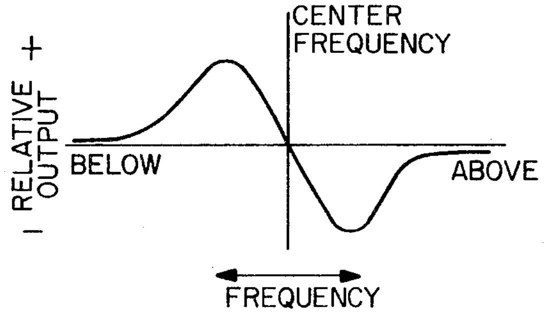
FIG. 2 is a voltage-frequency waveform of the output of FIG. 1.
Figure 3:
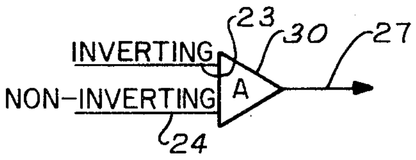
FIG. 3 is a partial circuit schematic of an alternative construction of FIG. 1.

In the operation of FIG. 1 with occasional reference to FIG. 2, let it be assumed for the purpose of example only and not for the purpose in any way of limiting the invention, that the input frequency at 9 is variable between 2 to 3 kilocycles (KHz). Let it further be assumed that the transformer T1, secondary S1, and capacitor C1 are tuned to 2 KHz while the transformer T2, secondary S2, and capacitor C2 are tuned to 3 KHz. In other words S1/C1 = 2 KHz while S2/C2 = 3 KHz establishing a center frequency of 2.5 KHz. If the input frequency at 9 is 2.5 KHz and the potentiometer R1 is adjusted to provide equal voltage signals to the transformer T1 and T2 primaries, the output voltage in the two channels to the two rectifiers will be equal producing equal voltages to R2,C7 and R3,C8 to produce zero voltage output at terminals 23 and 24. Consequently as long as the desired center frequency is maintained at the input a no-voltage signal will appear at the output 23,24 or 26,27.

If the input voltage at 9 varies above the center frequency of 2.5 KHz, the channel two tuned circuit will produce a greater voltage output on the leads 12 and 13 than the channel one output on leads 10 and 11. On the positive half-cycle of the frequency voltage signal diode D5 will apply a positive voltage to the positive sides of resistor R3 and capacitor C8, the negative sides thereof being coupled to terminal 20 through diode D7 back to the negative side through conductor 13 to secondary S2 thereby producing a relatively high voltage across R3 which is stored on capacitor C8. In like manner, the positive half-cycle of the input voltage will be applied over conductor 11 through capacitor C4 to terminal 15 of the rectifier through diode D2 to the positive side of resistor R2 and capacitor C7, the negative side of these elements being coupled to terminal 18 through diode D4 to the return lead 10 of the secondary S1. This establishes a low voltage across R2 which is stored in capacitor C7. Since the negative terminals of resistors R2 and R3 and capacitors C7 and C8 are coupled in common and are floating these voltages will add, however, the voltage across R3 being much greater than the voltage across R2 due to the input signal being nearer to the resonance of S2,C2 than to S1,C1 will produce a positive voltage at output terminals 22 and 24 represented in the square near these terminals and will produce a negative voltage as illustrated in a square near output terminals 19 and 23. Now since R4 is center-tapped into equal resistors R4A and R4B, the output voltage at 23 and 24 will be equal but opposite in polarity. If the input voltage at 9 varies by a frequency drop toward the 2.5 KHz center frequency the negative output voltage at 23 will drop toward zero and in like manner the positive voltage at output terminal 24 will drop toward zero to approach the crossover center frequency, as more particularly shown in FIG. 2 illustrating the voltage output at the upper terminal 23 or 26 as being a negative value until the frequency reaches the crossover point or center frequency shown in this figure. It may be well understood that the second half-cycle of the frequency input is applied across resistors R2 and R3 and capacitors C7 and C8 in like manner in which diodes D6 and D8 produce the voltage across R3 and capacitor C8, as shown by the polarity signs to continue the charge on C8 for each half-cycle applied, as well understood by those skilled in the art of full wave rectifiers. In like manner the second half-cycle of each input frequency waveform is applied through diodes D1 and D3 to apply the voltage across R2 to charge capacitor C7 in accordance with the polarity markings on these elements.

When the input frequency is on the center frequency it may be readily seen and understood that the voltage drop across resistor R3 will be equal to the voltage drop across resistor R2 and consequently the same voltage charge on capacitors C8 and C7 to produce a zero voltage at outputs 23 and 24. This produces the no-voltage output of the discriminator circuit when the input voltage is on center frequency.

As the input voltage frequency drops below the 2.5 KHz center frequency it approaches the tuned circuit of S1,C1 and rectification of the output from transformer T1 will produce a higher voltage drop across resistor R2 than across R3 thereby establishing a positive output voltage at terminal 23 and a negative output voltage at terminal 24, as shown by the positive and negative symbols in the circles near these leads. Accordingly, if the frequency drops below center frequency as shown in FIG. 2, the output terminal 23 or lead 26 will be in the positive direction although the positive output at terminal 23 will be equal but opposite in polarity to the output on terminal 24.

While the outputs 23 and 24 can be actively amplified in the differential amplifier 25 to produce amplified outputs 26 and 27, a single output could be obtained as shown in FIG. 2 by using an operational amplifier having the output terminal 23 coupled to the input inverting terminal of the operational amplifier 30 and the output terminal 24 coupled to the non-inverting terminal input of the amplifier 30.

D.C. isolation, and therefore stability is provided between the resonant circuits by the four capacitors C3 through C6. The value of each is dependent on the amount of the capacitive reactance that is acceptable. Typically, this is 0.02 microfarads for a 2 to 3 KHz span. Due to the D.C. isolation at the input to the diode bridges, the signal developed across the resistance R4 is balanced, or symmetrical, with respect to ground at all times. Additional gain, as well as impedance matching, can be accomplished by adjusting the primary and secondary winding turns ratio of T1 and T2. By using an active element for discriminator loading, such as the differential or operational amplifier, the effective gain of the circuit is equal to the transformer step-up gain plus the active element gain. The amplification or gain is developed in the passive components which generally allows active elements to run in a more stable condition. This increases the dynamic range of the circuits by this input. Voltage detection is accomplished by the full wave bridge thereby avoiding the half-wave filtering problems. Also the use of a bridge circuit in lieu of conventional full wave configuration provides twice the voltage (6 db gain) for a given input signal. Since the symmetrical condition always exists in this circuit and the static conditions of the differential amplifier 25 operation is zero volts out, signals applied to the discriminator will always provide a symmetrical output regardless of the amount of the signal unbalance. For applications requiring a threshold correction for automatic signal average (i.e., teletype demodulators, telemetric discriminators, and linear discriminators in general), this circuit will perform such functions as well as providing gain dependent on the differential amplifier selected. By properly chosing the S1/C1 and S2/C2 values this, circuit may be used with frequencies through the VHF range (i.e., as with an automatic frequency control discriminator in a radar receiver that requires a balanced input).

While many changes may be made in the component values to meet the conditions of frequencies discriminated or for particular applications, it is to be understood that I desire to be limited in the spirit of my invention only by the scope of the appended claims.

I claim:

1. An active linear discriminator circuit comprising:

a dual transformer having two primaries with one lead grounded and two center-tapped-to-ground secondaries;

a potentiometer having the resistance leads thereof coupled to one each transformer primary and having the adjustable tap providing an input to said transformer to balance the voltages in said primaries;

a reactance means in parallel to each secondary providing tuned circuits;

a full wave rectifier having an input coupled through direct current isolation means to each transformer secondary, each rectifier having an output, providing two channels;

a voltage storage means coupled to the output channel of each said rectifier; and a filter circuit coupled across the outputs of said channels to an output circuit whereby a variable frequency voltage applied to said input tap of said potentiometer will be discriminated to produce linearly varying direct current voltages proportional to the frequency variance from a predetermined center frequency to pass a narrow band of frequencies into output analog direct current voltage.

2. An active linear discriminator circuit as set forth in claim 1 wherein said full wave rectifier in each channel is a diode bridge circuit in which the coupling from said transformer secondary is to first two opposite corners of said diode bridge and said voltage storage means is across the second two opposite corners of the diode bridge with the rectifier output taken from one of said second two opposite corners of said diode bridge.

3. An active linear discriminator circuit as set forth in claim 2 wherein said filter circuit includes a capacitor and two resistors in series with the junction thereof coupled to a fixed potential, said capacitor and said series coupled resistors each coupled in parallel to said second two corners of said bridge circuit, said capacitors and resistors operating in conjunction with said storage means to provide ripple filtering in said output circuit.

4. An active linear discriminator circuit as set forth in claim 3 wherein said storage means consists of a resistance and a storage capacitor in parallel.

5. An active linear discriminator circuit as set forth in claim 4 wherein said reactance means is a capacitor.

6. An active linear discriminator circuit as set forth in claim 5 wherein said direct current isolation means are capacitors in each secondary lead coupling to said first two corners of said diode bridge circuit.

7. An active linear discriminator circuit as set forth in claim 6 wherein said output circuit includes an amplifier.

* * * * *